Figure 1:
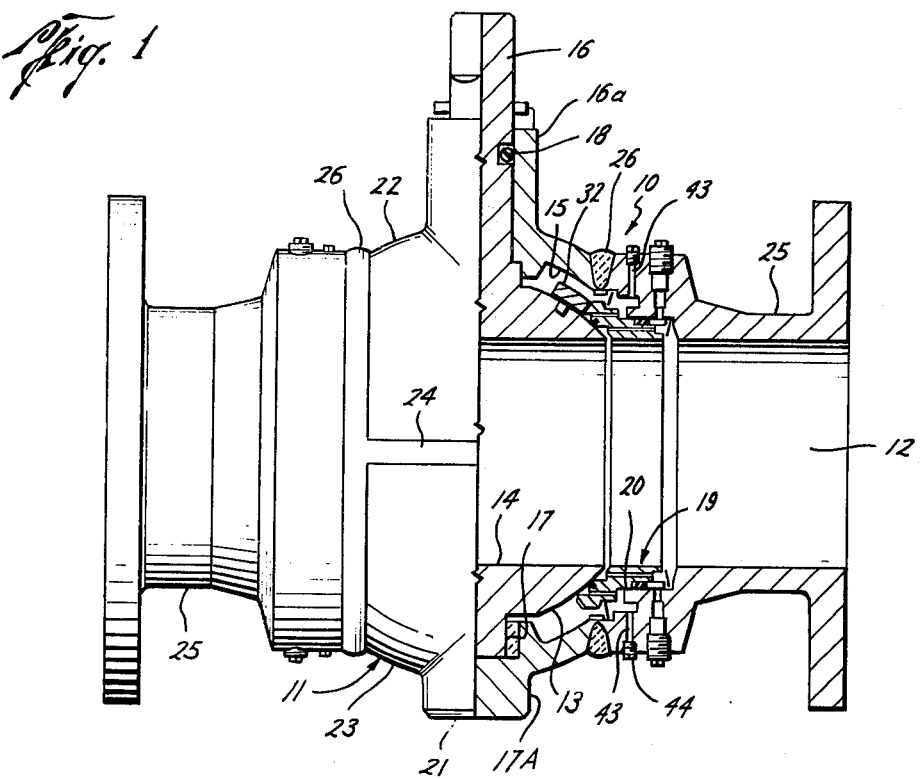

United States Patent [19]
Allen

[11] 3,916,940
[45] Nov. 4, 1975

[54] VALVE
[75] Inventor: Herbert Allen, Houston, Tex.
[73] Assignee: Cameron Iron Works, Inc., Houston, Tex.
[22] Filed: Jan. 14, 1974
[21] Appl. No.: 433,270

[52] U.S. Cl. ........... 137/340; 137/246.22; 137/330; 251/315; 29/157.1 R; 29/487
[51] Int. Cl.² ..................... F16K 49/00; F16K 5/06
[58] Field of Search ........ 251/315; 29/157.1 R, 487; 137/246.22, 315, 340

[56] References Cited
UNITED STATES PATENTS
3,478,403  11/1969  Wolfenperger ............ 29/157.1 R X
3,657,783  4/1972  Ellis ............................. 29/157.1 R Primary Examiner—Henry T. Klinksiek
Attorney, Agent, or Firm—W. F. Hyer; Marvin B. Eickenroht

[57] ABSTRACT

There is disclosed a valve having an annular passageway through which a coolant may be circulated in order to prevent damage to heat destructible parts captured within the valve due to the heat of a circumferential weldment formed on the body near said parts during manufacture of the valve.

10 Claims, 2 Drawing Figures

VALVE

This invention relates generally to valves; and, more particularly, to improvements in valves which, in the course of their manufacture, require the formation of a circumferential weldment on the body of the valve near parts, such as seals, metal springs and the like, which are heat destructible in that their properties would be adversely affected by the heat of the weldment.

In a valve of this type, such as that shown in U.S. Pat. No. 3,732,885, the body is made up of an intermediate portion in which a closure member is mounted for movement between positions opening and closing the valve, and end portions in which annular seats are mounted for engaging opposite sides of the closure member. As also shown in the prior patent, the seat may be ported to pass lubricant from an external source to its inner end adjacent a seal ring engaging the closure member. More particularly, the inner ends of the end portions of the body are welded to the oppositely facing open ends of the intermediate portion thereof, and seal rings are arranged between the seats and the body end portions in which they are mounted.

One important feature of this valve is that the seats are mounted within counterbores on the inner ends of the end portions of the body so that they are captured against removal when such end portions are welded to the intermediate body portion. Since this might require that the seal rings occupy a position so near the formation of the weldment as to destory their effectiveness, it was proposed, in the above-mentioned patent, to employ special manufacturing procedures for inserting the seal rings into operative sealing position only after formation of the weldment. This in turn required special manipulation of the seats within the valve body end portions both before and after welding.

It has also been proposed to urge the inner ends of the seats into initial engagement with the closure member by means of metal springs engaging the seats and the valve body. In some cases, it has been proposed to dispose the springs between enlarged heads adjacent the inner ends of the seats and the inner ends of the tubular end portions of the valve. In a valve of the type above described, this necessarily also locates the spring so close to the area of the body to be welded that it may damage the spring since the weldment may reach temperatures of a level sufficiently high to destroy the temper of the metal of such a spring.

An object of this invention is to provide a valve of this type and a method for manufacturing same in which such heat destructible parts are protected from the heat of the weldment, and, more particularly, in which such seal rings are so protected without the necessity of manipulating the seats, either before or after the formation of the weldment, and thus even though disposed in operative position engaging the seats and valve body during formation of the weldment.

Another object is to provide such a valve and method in which such parts are protected by the circulation of a coolant through a passageway which is arranged to prevent the coolant from directly contacting such area, which contact might otherwise overcool and thus quench the weldment.

A further object is to provide such a valve in which the coolant passageway may later serve to conduct lubricant to the inner end of the seat adjacent a seal ring contacting the closure member.

These and other objects are accomplished, in accordance with the illustrated embodiments of the invention, by a valve of the type above described having an annular passageway within its body which includes walls on the body which are spaced from the weldment and relatively near the heat destructible part, and means connecting the passageway with the exterior of the body to permit coolant to be circulated through the passgeway. As a result, the amount of heat transmitted to the part during welding is reduced sufficiently to protect the part from damage, even though in its operative position in engagement with the valve body during the welding operation.

In the illustrated embodiment of the invention, there are two such parts, one being a seal ring engaging a valve seat and a portion of the valve body in which it's mounted, with the passageway preferably being arranged intermediate the weldment and seal, and the other being a metal spring engaging the body and seat to urge the seat toward the closure member, and preferably forming another wall of the annular passageway, whereby the coolant circulating in the annular passageway directly cools the spring.

In accordance with another novel aspect of the present invention, a port through the seat cnnects the coolant passageway with the inner end of the seat to one side of a seal ring arranged to engage the closure member. Thus, following formation of the weldment, when circulation of coolant is no longer required, this port enables lubricant to be passed from the annular passageway to the inner end of the seat.

In the practice of the present invention, the valve is made up of parts which are formed in such a manner that, with the seat and seal means captured within the end portion of the body, and upon disposal of the intermediate and end portions of the body with their adjacent surfaces in position to be joined, they define the annular passageway through which coolant is to be circulated. In like manner, when such parts are assembled to cause the spring to be engaged between the body end portion and seat, such spring is positioned to form a wall of the above-described coolant passageway.

Figure 2:
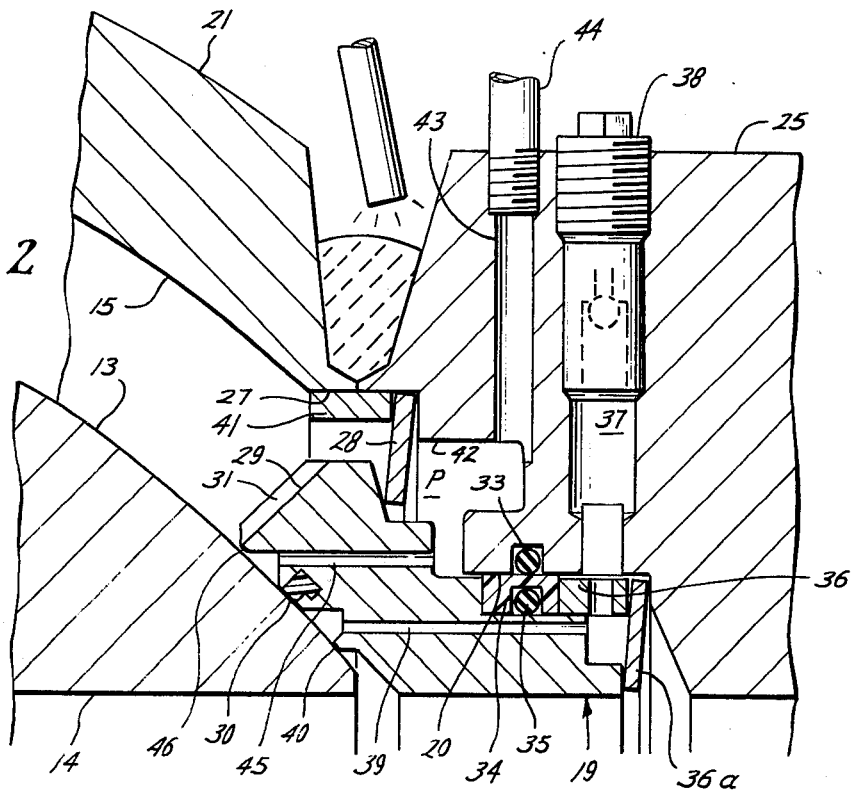

In the drawings, wherein like reference characters are used throughout to designate like parts:

FIG. 1 is a longitudinal sectional view of a valve constructed in accordance with an illustrative embodiment of the invention; and FIG. 2 is an enlarged sectional view of a portion of the valve of FIG. 1, including a seat engaging one side of the valve member and the seal means engaging the seat and valve body, and illustrating the formation of the weldment near the seal means.

With reference now to the details of the above-described drawings, the illustrated valve, which is indicated in its entirety in FIG. 1 by reference character 10, comprises a valve body 11 having a flowway 12 therethrough, and a ball closure 13 having a port 14 therethrough rotatably mounted within the valve body for selectively opening and closing the flowway. The ball closure is arranged concentrically within a spherically shaped chamber 15 intermediate the opposite cylindrical ends of the flowway, and has upper and lower stems 16 and 17 journalled within bearings 16a and 17A formed in the valve body at the upper and lower sides of the chamber. The upper stem has a seal ring 18 thereabout which forms a sliding seal in the upper bearing 16a, and has an exterior end to which a suitable operator (not shown) may be connected for rotating the ball closure.

An annular seat 19 is slidably mounted within an annular recess 20 in the valve body at the intersection of the righthand end of the flowway 12 with chamber 15, with its inner diameter forming a continuation of flowway 12. The inner end of the seat sealably engages the ball closure, and the outer diameter of the seat is sealably slidable within the recess 20, as will be described in more detail to follow. Although not shown, it will be understood that the lefthand side of the valve would be provided with a seat similar to that above described.

Chamber 15 is formed within an intermediate body portion 21 comprising upper and lower hemispherically shaped parts 22 and 23, respectively, having their adjacent sides welded together at 24 in a plane perpendicular to the axis of rotation of the ball closure to define openings 27 (FIG. 2) in each end thereof. The valve body 11 also includes a pair of tubular end portions 25 each having an inner end welded at 26 to an annular surface of the intermediate body portions surrounding the opening 27 therein. The inner end of the tubular portion is counterbored to provide the recess 20 in which the seat 19 is axially slidable, and the seats extend through the opening 27 and thus across and near the weldments 26.

The inner end of the seat 19 is yieldably urged against the ball closure 13 by means of a metal spring 28 engaging the inner end of body end portion 25 and an enlarged head 29 on the inner end of the seat. A seal ring 30 is carried on the inner end of the seat 19 for sealably engaging the ball closure when urged thereagainst either by spring 28 or by the spring supplemented by line pressure. The inner end of the seat is also provided with teeth 31 thereabout, and dogs 32 (FIG. 1) are mounted on the closure member for engaging the teeth, as the closure member is rotated between opened and closed positions, so as to cause the seat to be rotated between successive rotative positions, as more fully described in U.S. Pat. No. 3,157,190.

As shown in FIG. 2, a seal ring 33 of rubber-like material is carried within a groove in the recess 20 to form a sliding seal between the inner side of body portion 25 and the outer diameter of seat 19. As illustrated, the seat includes a main body having an outer recess in which a ring 34 of Teflon is received. The seal ring 33 seals with respect to the outer diameter of the Teflon ring 34, and the inner diameter of the ring 34 has a groove for receiving another rubber-like seal ring 35 which seals with respect to the outer recess of the main body of the ring 19. The ring 34 is held in position by means of a spacer ring 36 which bears against a spring 36a which engages the outer end of the recess 20 and the outer end of the main body of the seat 19 to urge the inner end of the seat against the ball closure.

As also shown in FIG. 2, a port 37 is formed in end body portion 25 to connect the exterior of the body with the recess 20, and a fitting 38 of conventional construction is disposed in the outer end of port 37 for introducing lubricant through the port. A hole is formed in the spacer ring 36, and passageways 39 are formed through the main body of the seat 19, so that lubricant passing through the port 37 will be confined by the spring 36a for passage through the passageways 39 to the inner end of the seat 19. A rim 40 is formed on the inner end of the main body portion of the seat inwardly of the passageways 39 to confine the lubricant flowing through the passageways to an annular space between the rim and the seal ring 30, thereby assisting in formation of a seal against predominant pressure on the outer side of the seat.

As best shown in FIG. 2, the oppositely facing ends of the intermediate and end body portions of the valve are recessed outwardly of their abutting surfaces to provide an annular space into which weld material may be placed. An annular shield 41 is disposed across the inner ends of the abutting surfaces of the body portions so as to prevent weld material from passing into the interior of the valve body.

As will be appreciated from FIG. 2, the rubber-like seal ring 33 is near the area of the weldment and, in fact, is in direct heat conductive relationship with the weldment through the metal forming the end portion of the valve body. Thus, in the absence of the novel features of the present invention, the seat 19 and the seal ring 33 could not be mounted in the positions of FIG. 2, during formation of the weld, without risking damage to the seal ring.

In order to avoid this risk, without the necessity of special assembly procedures, the end body portion is provided with an outer recess 42 having walls which are intermediate the area of the weld and the seal ring 33 and which cooperate with the spring 28 and the outer side of the seat 19 to form an annular coolant passageway P. A coolant is circulated through the passageway by means of ports 43 connecting it with the exterior of the valve body. Thus, coolant may be introduced through a conduit 44 connecting with an upper passageway 43 and exhausted from the annular passageway P through a conduit 44 connecting with the port 33 in the lower end of the valve body.

Since the walls of the valve body which form a large portion of the passageway P are intermediate the weld area and seal ring 33, a substantial portion of the heat from the weldment is prevented from being conducted through the valve body to the seal ring, without, however, directly contacting the weld area with the coolant. At the same time, the coolant is, by virtue of its direct contact with the spring 28, effective to prevent the spring from reaching a temperature which would destroy its temper. At the same time, coolant does not contact shield 41 so that the actual weld area is not overcooled.

As will be appreciated, the passageway P is formed within the valve body merely upon assembly of the parts of the valve. That is, the seat 19, along with the seal ring 33 and spring 28, are first mounted in the inner end of the body end portion 25. Then, upon movement of the end surfaces of the intermediate and end body portions into abutting position, the inner end of the seat 19 is caused to engage the ball closure 13, and thereby compress the sping 28 into tight engagement with body portion 25 and the seat.

One or more passageways 45 are formed through the main body of the seat 19 to connect the passageway P with the inner end of the seat outwardly of the seal ring 30. Also, a rim 46 is formed on the inner end of the seat outwardly of the passageways 45 so as to define a confined area on the inner end of the seat outwardly of the seal ring 30. Upon completion of the weldment, and thus completion of the circulation of coolant through the passageway P, ports 43 may instead be used for passing lubricant from suitable fittings on their outer ends into the confined area on the outer side of the seal ring 30. This would be especially useful in the event the predominant pressure to be sealed against is from the inner side of the seat.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A valve, comprising a body having a flowway therethrough and a substantially cicumferential weldment thereabout, a closure member mounted in the body for movement between positions opening and closing the flowway, a heat destructible part captured within and engaging the body near and generally concentric with the weldment, means providing an annular passageway within the body which is generally concentric with the weldment and includes walls on said body which are spaced from the weldment and relatively near the heat desctructible part, and means including a pair of circumferentially spaced apart ports connecting said annular passageway with the exterior of said body to permit coolant to be circulated through said passageway in order to reduce the transmission of heat to said part during formation of the weldment.

2. A valve of the character defined in claim 1, wherein said part comprises a seal ring.

3. A valve of the character defined in claim 1, wherein said part comprises a metal spring.

4. A valve, comprising a body having a flowway therethrough, a closure member mounted in the body for movement between positions opening and closing the flowway, an annular seat captured within the body and engaging one side of the closure member, annular seal means engaging the seat and body, said body having an annular weldment near and generally concentric with the seal means, means providing an annular passageway within the body which is generally concentric with the weldment and the seal means and includes walls on said body which are generally intermediate said weldment and seal means, and means including a pair of circumferentially spaced apart ports connecting said annular passageway with the exterior of said body to permit coolant to be circulated through said passageway.

5. A valve of the character defined in claim 4, wherein said seat includes a seal ring on its inner end for engaging the closure member, and a port connecting the passageway with the inner end of the seat adjacent said seal ring to pass lubricant introduced through the connecting means after formation of the weldment.

6. A valve, comprising a body including an intermediate portion welded to an end portion to form a flowway therethrough, a closure member mounted in the intermediate body portion for movement between positions opening and closing the flowway, an annular seat captured within the end body portion for engaging one side of the closure member, annular seal means engaging the seat and the body end portion, means providing an annular passageway within the body including walls on said body end portion which are generally intermediate said weldment and seal means, and means including a pair of circumferentially spaced apart ports connecting said annular passageway with the exterior of said body to permit coolant to be circulated through said passageway.

7. A valve of the character defined in claim 6, including an annular metal spring engaging the body end portion and seat to urge the seat toward the closure member and having one side which forms a wall of said annular passageway.

8. In a method of manufacturing a valve having parts which include a body, a closure member mounted in the body for opening and closing a flowway therethrough, an annular seat captured within the body for engaging a side of the closure member, and seal means adapted to engage the body and seat, and wherein a weldment is to be formed about the body near the seal means, the steps of forming the parts of the valve in such a manner that, upon their assembly and prior to formation of the weldment, they define an annular passageway in the body which includes walls generally intermediate and in heat conductive relation with the weldment and seal means, and circulating a coolant through the passageway during formation of said weldment.

9. In a method of manufacturing a valve having parts which include a body having intermediate and end portions, a closure member adapted to be mounted in the intermediate portion; a seat adapted to be captured in the end body portion for engaging a side of the closure member, and seal means to engage the seat and the end body portion, and wherein adjacent surfaces of the intermediate and end portions are to be joined by a weldment, the steps of forming the parts of the valve in such a manner that, with the seat captured in the end body portion and the seal means engaging the seat and end body portion, and upon disposal of the body portions with their adjacent surfaces in position to be joined, said parts define an annular passageway in the body which includes walls generally intermediate and in heat conductive relation with said surfaces and seal means, circulating coolant through said passageway, and forming said weldment during the circulation of said coolant.

10. In a method of the character defined in claim 9, wherein the body parts also include a metal spring for engaging the seat and body to urge the seat against the closure member, and said spring is so formed and assembled as to provide a wall of said annular passageway.

* * * * *